March 27, 1962  R. E. GOEHRING  3,027,088
AUTOMATIC HEATER FLOW CONTROL
Filed March 30, 1959
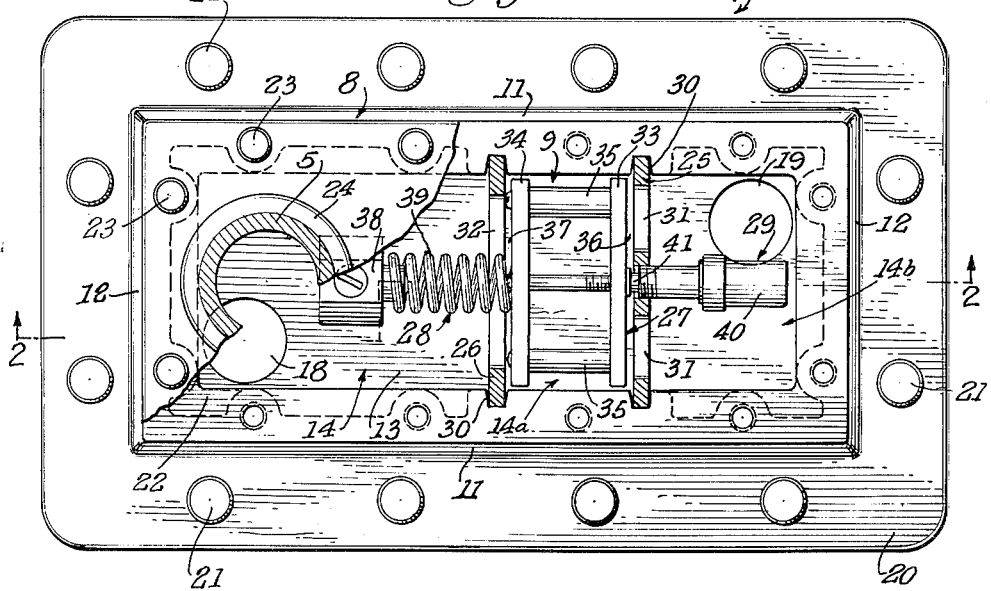
Fig. 1.
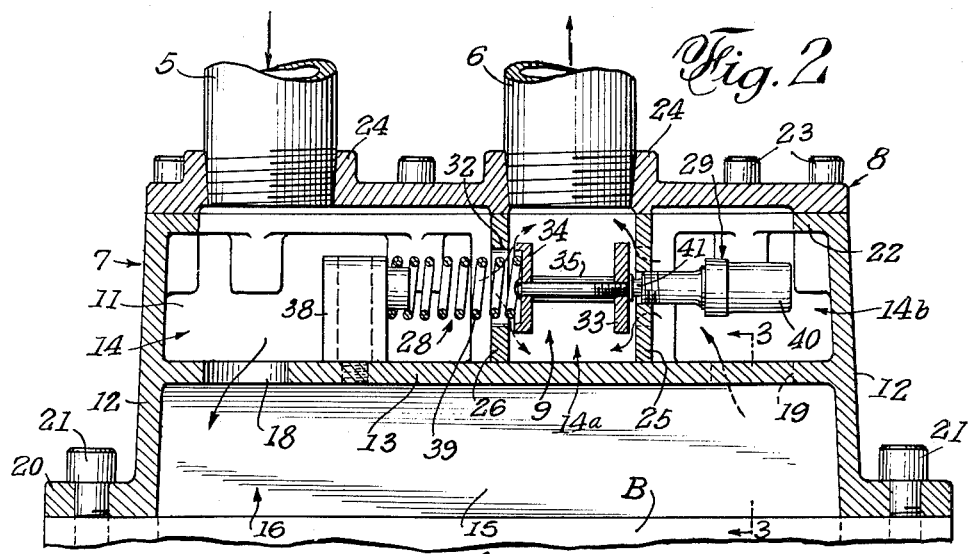
Fig. 2.
Fig. 3.
INVENTOR.
RICHARD E. GOEHRING
BY C. G. Stratton
ATTORNEY

United States Patent Office 3,027,088
Patented Mar. 27, 1962

3,027,088
AUTOMATIC HEATER FLOW CONTROL
Richard E. Goehring, 2311 Merced Ave., El Monte, Calif.
Filed Mar. 30, 1959, Ser. No. 802,678
6 Claims. (Cl. 236—12)

This invention relates to an automatic control for the flow of water through a heater, particularly the heater controlling the temperature of a swimming pool.

The flow of swimming pool water through a heater depends largely on the efficiency of a filter in the line. A clogged filter will retard flow according to the degree to which the same is clogged. A completely clean filter will allow maximum flow but only part of such full flow requires to be heated. Prior installations incorporated a manually settable flow controlling valve in the line to the heater and by-passed the remainder of the flow. As a result, the operation was quite variable since filters clog up in a progressive manner. Thus, it was quite difficult to keep the pool temperature at a constant temperature. Moreover, constant watching and testing was required even for an approximately satisfactory operation under control of the manual valve in the system. Further, upon cleaning or back-washing of the filter, failure to remember to re-set the control valve would result in a too copious flow through the boiler or heater, causing excessive lime deposits in the heater tubes of the boiler and expensive-to-repair damage. Another fault of present or prior installations is the need for external piping in the line that has the manual valve, piping that can be connected up only in the field and at high labor cost.

An object of the present invention is to provide an automatic flow control in the line between the filter and the heater to obviate the above-mentioned faults in prior installations of swimming pool heating means.

Another object of the invention is to provide a heater or boiler with a unitary installation for automatic control of both by-pass flow and flow to be heated by the boiler, thereby enabling factory setting of the flow controlling means.

A further object of the invention is to provide a boiler with a novel head in which a valve is embodied to control flow through the boiler and also by-pass flow, the temperature of the boiler-heated water being utilized to automatically vary the by-pass flow and the flow to the boiler.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

FIG. 1 is a partly broken plan view of an automatic heater flow control according to the present invention.

FIG. 2 is a vertical sectional view thereof as taken on the line 2—2 of FIG. 1.

FIG. 3 is a fragmentary vertical sectional view as taken on the line 3—3 of FIG. 2.

The boiler B is quite conventional in that, by means of tubes or pipes, the same conducts a flow of water, such as may be supplied by a pipe 5 from the outlet side of a pool filter, and discharges the heated water through a pipe 6 to return to the pool from which water was pumped to the intake side of the filter.

According to the present invention, a head 7 is provided on the top of the boiler B, a cover or cap plate 8 closes the head 7 and has the pipes 5 and 6 connected thereto, and a thermally-controlled valve 9 is embodied in said head to control the flow through the boiler B and the by-pass flow between the pipes 5 and 6, thereby enabling control of the water to a constant temperature.

The head 7 is preferably cast and comprises side walls 11 and end walls 12 that define a rectangular housing open at the bottom and at the top, a horizontal partition 13 divides the housing into an upper flow chamber 14 and a lower chamber that is divided by a longitudinal partition 15 into a lower inlet chamber 16 and a lower outlet chamber 17. An opening 18 in partition 13 provides flow communication between chambers 14 and 16 and a similar opening 19 in said partition 13 provides flow communication between chambers 14 and 17. An outwardly directed flange 20 on the lower end of said head is fitted to the upper end of the boiler B, and cap screws or the like 21 connect said boiler and head flange so that said head constitutes the upper portion of the boiler. An inwardly directed flange 22 on the upper end of the head 7 receives the cover plate 8 which is secured in place by cap screws 23. Suitable gaskets may be provided to line both said flanges 20 and 22 to seal the flow within the head.

The cover plate 8 merely closes the top of the head 7 and is provided with internally threaded bosses 24 for the threaded ends of pipes 5 and 6. Thus, said pipes open into the chamber 14 preferably in side-by-side relationship.

The valve 9 is shown as disposed in the chamber 14 and comprising, generally, spaced orifice plates 25 and 26 spanning transversely across the chamber 14, one on each side of the pipe 6, thereby enclosing a chamber portion 14a in communication with said pipe; a valve unit 27 disposed between the orifice plates; means 28 biasing said unit 27 in a direction to restrict the flow through the orifice plate 25; and thermally-controlled means 29 to move the valve unit in a direction counter to the bias of means 28 to increase flow through said plate 25.

The plates 25 and 26 are shown as held in position by engagement of their ends in grooves 30 formed in the inner faces of the head walls 11. The height of said plates 25 and 26 is such as to extend between partition 13 and cover plate 8 and flow from chamber 14 into chamber portion 14a can occur only through the orifices 31 and 32 in said plates, respectively.

The valve unit 27 comprises parallel plates 33 and 34 separated by spacers 35 of such length that the distance across the plates 33 and 34 is substantially less than the distance between plates 25 and 26. As a consequence, said unit 27 is movable in the chamber 14a toward one or the other of the plates 25 and 26 so as to vary the gap 36 between orifice plate 25 and valve plate 33, at the same time varying the gap 37 between the orifice plate 26 and the valve plate 34. It will be noted that said valve plates 33 and 34 are of such size areally, as to close the orifice 31 or 32 depending upon the position of the valve unit 27 in chamber 14a.

The means 28 is shown as in abutment 38 in chamber 14 and carried by the partition 13, and a helical spring 39 with one end against said abutment and the other passing through orifice 32 and in abutment with valve plate 34.

The means 29 is shown as a commercial unit that has a housing 40 that is carried by orifice plate 25 and is disposed in the portion 14b of the chamber 14. Said unit 29 has a stem or plunger 41 within the housing 40 and the same is connected to the valve plate 33.

The unit 29 operates to expand longitudinally under increased heat and to contract upon cooling of the area in which disposed. Thus, when the temperature in chamber 14b is high, the device expands by projecting the stem 41 and, when the temperature in said chamber 14a lowers, the device contracts causing retraction of said stem 41.

Operation

The flow from pipe 5 enters the chamber 14, passes through opening 18 into lower chamber 16. Said flow then circulates through the boiler B and is heated thereby. The heated water then rises and enters the lower chamber 17, passing through opening 19 into the chamber part 14b. If this water is of the proper heat to which the device 29 had been set, the same will pass through orifices 31 and past the gap 36 into the chamber part 14a and then outwardly through pipe 6.

If the water is hotter than desired, 120° F. being exemplary, the unit 29 will react by projecting its stem 41, thereby increasing the gap 36. If the water is colder than desired, said stem 41 will retract, decreasing said gap 36. It will be clear that increase of gap 36 causes a commensurate decrease in the size of gap 37, and decrease of gap 36, a commensurate increase in the size of gap 37. It will also be clear that the sum of the areas of the two gaps is always the same but, as the flow to the boiler is increased, the by-pass flow past gap 37 between chamber 14 and chamber part 14a is decreased and, when the flow in the boiler is decreased, the by-pass flow is increased accordingly.

Since a restricted flow through the boiler causes the water to reach a higher temperature at chamber 14b, increasing the size of the restriction by shifting the valve unit 27 to increase the gap 36 speeds flow through the boiler and, therefore, causes lowering of the water temperature in chamber 14a.

It will be noted that there is full flow between pipes 5 and 6 but the proportion of flow by-passed and the proportion passing through the boiler B vary according to the response to temperature changes by the unit 29. Accordingly, the operation is independent of filter efficiency and a constant temperature is maintained on the water being heated.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. In an automatic heater flow control, a housing provided with an inlet and an outlet, a pair of parallel orifice plates spanning across said housing and dividing the same into three in-line chambers with the outlet extending from the middle chamber and the inlet entering one of the end chambers, the orifice plates being disposed one on each side of the outlet, said plates having orifices for flow between the respective end chambers and the middle chamber, a valve unit disposed in the middle chamber between said plates and mounted for adjustable movement toward one orifice plate or the other to vary the flow through the latter plates to the outlet, resilient means disposed in the chamber having the inlet and engaged with the valve unit to bias the same in a direction to decrease the flow through one orifice plate, the other end chamber having a hot water inlet, and thermally-responsive and length-extensible means in the other end chamber and subject to the flow thereinto to move the valve unit against said bias to increase the flow through said one orifice plate, the flow through the other orifice plate increasing or decreasing according to the decrease or increase of flow through said one orifice plate.

2. In an automatic heater flow control according to claim 1, said housing being provided with a fourth chamber in communication with the mentioned chamber having the inlet and with a fifth chamber in communication with said mentioned chamber having the thermally-responsive means, the mentioned thermally-responsive means, thereby, being disposed in flow between said fifth chamber and the outlet and subject to the temperature of such flow.

3. In an automatic heater flow control according to claim 1, said housing being provided with a fourth chamber in communication with the mentioned chamber having the inlet and with a fifth chamber in communication with said mentioned chamber having the thermally-responsive means, the mentioned thermally-responsive means, thereby, being disposed in flow between said fifth chamber and the outlet and subject to the temperature of such flow, the fourth and fifth chambers being disposed in a plane offset from the plane of the in-line chambers, the housing having a wall separating the mentioned middle chamber from the fourth and fifth chambers.

4. An automatic heater flow control comprising a housing provided with two orifice walls dividing the housing into three in-line chambers, said walls having orifices for flow between the respective end chambers and the middle chamber, an inlet connected to one end chamber, an outlet connected to the middle chamber, a valve operatively associated with the orifice walls to control flow therethrough to increase the flow through one wall while simultaneously decreasing the flow through the other wall, an outlet port in the end chamber that has the inlet for flow therethrough from said end chamber directly to a heater, an inlet port in the other end chamber for flow therethrough into said other chamber from the heater, and thermally-responsive means disposed in the latter end chamber and subject to the flow through the mentioned inlet port from the heater and operatively connected to the valve to move said valve relative to the orifice walls according to the temperature of the flow in said latter end chamber to simultaneously increase the flow through one wall and decrease the flow through the other wall to, thereby, proportion the flow into the middle outlet chamber, accordingly.

5. An automatic heater flow control according to claim 4 in which resilient means is disposed at least partly in the end chamber having the inlet and is engaged with the valve to bias the same in a direction to decrease flow through the wall between the other end chamber and the middle chamber.

6. In an automatic heater flow control, a housing provided with an inlet and an outlet, a pair of orifice walls spanning across said housing and dividing the same into three in-line chambers with the outlet extending from the middle chamber and the inlet entering one of the end chambers, said walls being disposed one on each side of the outlet, said walls having orifices for flow between the respective end chambers and the middle chamber, an outlet port in the end chamber that has the inlet for flow therethrough from said end chamber directly to a heater, an inlet port in the other end chamber for flow therethrough into said other chamber from the heater, a valve unit operatively associated with said walls and mounted for adjustable movement toward one orifice wall or the other to vary the flow through said walls to the outlet, resilient means disposed at least partly in the end chamber that has the inlet and engaged with the valve unit to bias the same in a direction to decrease flow through the orifice wall between the opposite end chamber and the middle chamber, and thermally-responsive and length-extensible means in said opposite end chamber and subject to the flow from the heater thereinto to move the valve unit against said bias to increase flow through the last-mentioned orifice wall, the valve, under control of said resilient means and thermally-responsive means, simultaneously increasing flow through one wall while decreasing flow through the other.

References Cited in the file of this patent

UNITED STATES PATENTS

| | | |
|---|---|---|
| 1,985,929 | Jorgensen et al. | Jan. 1, 1935 |
| 2,016,331 | Junkers | Oct. 8, 1935 |
| 2,359,448 | Shaw | Oct. 3, 1944 |
| 2,884,197 | Whittell | Apr. 28, 1959 |

FOREIGN PATENTS

| 79,030 | Denmark | Mar. 21, 1955 |
|---|---|---|